United States Patent
Chattin et al.

(10) Patent No.: US 7,575,509 B2
(45) Date of Patent: Aug. 18, 2009

(54) MACHINE FOR SCRUBBING EXTERIOR OF FOWL AND METHOD OF USE THEREOF

(75) Inventors: Johnny Allen Chattin, Dahlonega, GA (US); Scott L. Davis, Dahlonega, GA (US)

(73) Assignee: Davis Poultry Equipment, Inc., Dawsonville, GA (US)

( * ) Notice: Subject to any disclaimer, the term of this patent is extended or adjusted under 35 U.S.C. 154(b) by 0 days.

(21) Appl. No.: 12/019,846

(22) Filed: Jan. 25, 2008

(65) Prior Publication Data

US 2008/0182496 A1    Jul. 31, 2008

Related U.S. Application Data

(60) Provisional application No. 60/897,797, filed on Jan. 26, 2007.

(51) Int. Cl.
A22C 21/06    (2006.01)
(52) U.S. Cl. .................................................. 452/95
(58) Field of Classification Search ............... 452/173, 452/75, 76, 87–93, 63
See application file for complete search history.

(56) References Cited

U.S. PATENT DOCUMENTS

| | | | |
|---|---|---|---|
| 2,054,576 A | 9/1936 | Waugh | |
| 2,305,232 A | 12/1942 | Barker | |
| 2,536,826 A | 1/1951 | Taus | |
| 3,137,031 A | 6/1964 | Ine | |
| 3,471,893 A * | 10/1969 | Frederick et al. | 452/89 |
| 3,477,093 A * | 11/1969 | Frederick et al. | 452/91 |
| 3,673,637 A | 7/1972 | Crane | |
| 3,747,159 A * | 7/1973 | Harben, Jr. | 452/91 |
| 3,797,068 A * | 3/1974 | Dillon | 452/76 |
| 3,803,669 A | 4/1974 | Dillon | |
| 4,106,161 A | 8/1978 | Niccolls | |
| 4,179,772 A * | 12/1979 | Harben, Jr. | 452/90 |
| 4,217,678 A * | 8/1980 | Crawford et al. | 452/91 |
| 4,282,632 A | 8/1981 | Conaway | |
| 4,330,903 A | 5/1982 | Vilotti | |
| 4,514,879 A * | 5/1985 | Hazenbroek | 452/91 |
| 4,535,509 A | 8/1985 | Bullock et al. | |
| 4,876,767 A | 10/1989 | Harben, III et al. | |
| 4,882,811 A | 11/1989 | Ewing | |
| 4,899,421 A | 2/1990 | Van Der Eerden | |
| 5,041,054 A | 8/1991 | van den Nieuwelaar et al. | |
| 5,484,332 A * | 1/1996 | Leech et al. | 452/173 |
| 5,538,467 A | 7/1996 | Wodajo | |
| 5,605,503 A * | 2/1997 | Martin | 452/173 |

(Continued)

*Primary Examiner*—Thomas Price
(74) *Attorney, Agent, or Firm*—Alston & Bird LLP

(57) ABSTRACT

A machine for scrubbing a fowl, wherein the machine comprises at least one pair of opposing rotating brushes, wherein the fowl passes between said at least one pair of opposing rotating brushes. The pair of opposing rotating brushes comprises a first rotating scrubber and a second rotating scrubber having bristles extending therefrom. The fowl is suspended via a shackle suspended from a track, wherein the height of the scrubbing machine may be selectively varied via a threaded height adjuster. The bristles of the machine are rotated, wherein the bristles contact the exterior of fowl travelling through the machine. Jets of water, or other cleaning fluid, spray inwardly to reach the fowl and the scrubbing bristles to rinse removed material from the fowl and bristles. The brushes are rotated through hubs attached to gears powered by a motor, wherein the gears may be selectively rotated in either direction.

13 Claims, 7 Drawing Sheets

U.S. PATENT DOCUMENTS

| | | |
|---|---|---|
| 5,628,680 A | 5/1997 | Hjorth |
| 5,853,320 A * | 12/1998 | Wathes et al. ............. 452/88 |
| 5,863,245 A | 1/1999 | Elduayen et al. |
| 6,083,095 A | 7/2000 | Simmons |
| 6,146,263 A | 11/2000 | Mostoller et al. |
| 6,213,864 B1 | 4/2001 | Griffiths et al. |
| 6,733,379 B2 | 5/2004 | Tsang |
| 6,918,825 B2 | 7/2005 | Conaway |

* cited by examiner

MACHINE FOR SCRUBBING EXTERIOR OF FOWL AND METHOD OF USE THEREOF

CROSS-REFERENCE TO RELATED APPLICATIONS

To the fullest extent permitted by law, this non-provisional patent application claims priority to, and the full benefit of, U.S. Provisional Patent Application No. 60/897,797, filed Jan. 26, 2007, entitled "Machine for Scrubbing Exterior of Fowl and Method of Use Thereof". Application No. 60/897,797 is hereby incorporated by reference in its entirety for all of its teachings.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to an apparatus for scrubbing the outside of a fowl, and more specifically to a machine comprising rotating bristles and water sprays that brush the outside of a fowl's carcass as it traverses the machine.

2. Description of Related Art

During the slaughtering of poultry for processing into food, various contaminants are found about the fowl's carcass that are sources of bacteria leading to sickness in consumers that eat the meat of the fowl. Accordingly, the contaminants must be reduced to strict inspection standards or, otherwise, the contaminant level causes rejection or a need for reprocessing of that carcass.

Typically, two modes of cleaning the outside of the carcass of poultry have been utilized by the poultry processing industry. In the first mode, a carcass is moved through a cabinet by means of an overhead conveyance from which a shackle is attached, wherein the carcass is suspended by the tarsal joint of the leg with the neck being disposed below the body of the carcass. A series of sprayers mounted inside of the cabinet is directed at the carcass.

Cleaning fluid is sprayed onto the outside of the carcass and must be able to get under various creases, particularly in and around the wing area of the carcass. A large quantity of cleaning fluid, along with high pressure, is required to accomplish adequate cleaning since it must move portions of the wing area to reach these creases. In particular, adequate pressure must be maintained as the spray reaches the parts of the carcass that are farthest from the sprayer. Due to the high pressure and need to sustain the pressure as it reaches the most distant parts of the fowl, cleaning fluid consumption is increased, leading to higher costs of operation.

The second mode comprises a row of axially-mounted brushes with bristles extending out from a central shaft. The central shaft has bearing housings mounted on both ends through which the shaft extends. One end of the shaft extends into a means of engagement having a motive means. The shaft and brush arrangements form each of two opposing sides, wherein the rotational shaft of the brush is located parallel to the path that the carcass travels. Similar arrangements have the shaft on an angle to maintain coverage of the entire carcass with the brush. Cleaning fluid is sprayed onto the carcass through an arrangement of sprayers directed at the carcass and brush. Unfortunately, the axial parallel motion of the brush has limited rotation, contacting only the side of the carcass and the axial parallel motion is either downward motion its entire length or upward its entire length. This leads to the wing, and/or creases therein, being brushed in one direction, leaving areas having no exposure to the bristles of the brush or cleaning fluid spray.

Therefore, it is readily apparent that there is a need for a machine for scrubbing the full exterior of a fowl to remove bacteria and other contaminants.

BRIEF SUMMARY OF THE INVENTION

Briefly described, in a preferred embodiment, the present invention overcomes the above-mentioned disadvantages and meets the recognized need for such an apparatus by providing a machine for scrubbing the exterior of fowl and method of use thereof, wherein a poultry carcass is traversed via an overhead conveyance. A shackle is suspended from the overhead conveyance, in which both tarsal joints of the poultry carcass are secured and the body of the carcass is exposed to the machine for scrubbing.

The carcass is conveyed through a series of opposing rotational hubs, each hub comprising a set of brushes with lobes, wherein each brush consists of bristles extending from the face of each lobe. As the carcass moves through one brush set it is scrubbed by each bristle at the beginning of the brush that is rotated upward, and then upon the carcass reaching the end of the brush, downward by rotation of each bristle at the end of the brush, while an adjacent brush set rotates such that the bristles scrub the carcass first downward and then upward by the rotation of each brush and traversal of the carcass therepast. Accordingly, an advantage the present invention is its ability to clean contaminants from the exterior of a fowl via rotating brushes.

According to its major aspects and broadly stated, the present invention in its preferred form is a machine for scrubbing the exterior of a fowl and method of use thereof, wherein the machine comprises at least one pair of opposing rotating brushes. The fowl passes between the opposing rotating brushes and is scrubbed by at least one pair of the opposing rotating brushes.

The pair of opposing rotating brushes comprises a first rotating scrubber having bristles extending therefrom and a second rotating scrubber having bristles extended therefrom. The first rotating scrubber and the second rotating scrubber are separated by a gap that is narrower then the width of the fowl. The first scrubber bristles and the second scrubber bristles extend toward each other. Additionally, each pair of rotating brushes comprises brushes from either a top row of hubs or a bottom row of hubs, wherein the hubs are driven by gears that are toothedly engaged in a staggered configuration, and wherein rotation of the first gear drives the second gear and the subsequent rotation of the second gear drives the third gear, and so on. Each brush comprises lobes that have throughholes, wherein the first and second scrubber bristles are inserted tip first in the throughholes of each lobe.

The scrubber machine further comprises a first cabinet and a second cabinet that each have an inside surface. The inside surfaces of the cabinets face each other across a channel. The first cabinet has a series of brushes that are staggered in a top row and bottom row configuration. Likewise, the second cabinet comprises a second series of brushes that are staggered in a top row and bottom row configuration. The first brush from the first series of brushes and the first opposing brush from the second series of brushes form a pair of opposing rotating brushes. The first brush rotates counterclockwise and the first opposing brush rotates clockwise when viewed from the channel. Similarly, the second brush from the first series of brushes and a second opposing brush from the second series of brushes form a second pair of the pairs of opposing rotating brushes, such that the second brush rotates clockwise and the second opposing brush rotates counterclockwise when viewed from the channel.

The first and second cabinets are suspended from above on rollers, and comprise height adjusters and width adjusters. The machine further comprises water sprayers. The height adjusters selectively move the cabinets up or down and the width adjusters position the two cabinets apart by a selected dimension.

The machine provides a method for scrubbing a fowl. The fowl's tarsal joints are placed into a shackle and the shackles are secured to a conveyer belt. The fowl is then conveyed through a plurality of pairs of opposing rotating brushes that comprise bristles and extend toward each other from the opposing rotating brushes. The bristles of the rotating brushes then scrub the fowl as it is conveyed through the machine.

Additionally, the machine comprises a frame, wherein the frame comprises the first cabinet and the second cabinet suspended therefrom. The first and second cabinets are positionable at a selected dimension relative to one another and are secured at said selected dimension. The first cabinet and the second cabinet have bristles extending from the inside surfaces thereof on brushes, and the selected dimension permits passage of the fowl between and in contact with the bristles, wherein the bristles scrub the exterior of the fowl. The first inside surface comprises a first series of brushes extending from said first inside surface and wherein said second side cabinet comprises a second series of brushes extending from said second inside surface. The alternating individual brushes of the first series of brushes and the alternating individual brushes of the second series brushes rotate in opposite directions. The brushes comprise bristles that are removable and inserted through the throughholes of the lobes, and secured via a fastener. The apparatus also has water sprayers and the first and second side cabinets comprise height adjustments. Accordingly, an advantage of the present invention is its ability to be selectively rotationally-modified to provide different patterns of brushing.

More specifically, the present invention is a machine for scrubbing the exterior of a fowl, the machine having a scrubber, a track, a central channel, a first gear cabinet and a second gear cabinet. The first gear cabinet comprises a first brush set and the second gear cabinet comprises a second brush set. The first brush set and the second brush set are disposed within the central channel and the track is disposed above the central channel, wherein the track comprises a shackle for suspending the bird.

The first gear cabinet comprises doors, a motor, a ninety degree gearbox and a first gear set, wherein the first gear set comprises hubs, gears and brushes. The motor, through the ninety degree gearbox, rotates a first individual gear, wherein the first individual gear engages and rotates a second individual gear, wherein the second individual gear engages and rotates a third individual gear, wherein the third individual gear engages and rotates a fourth individual gear, and so on in sequence through each individual gear.

Accordingly, rotation of the first individual gear of the first gear cabinet, via the motor through the ninety degree gearbox, rotates the remainder of gears, wherein odd-numbered gears rotate in a counterclockwise direction if viewed from a rear of the first gear cabinet and even-numbered gears rotate in a clockwise direction when viewed from the rear of the first gear cabinet.

The second gear cabinet comprises a second gear set, doors, a motor and a ninety degree gearbox. The second gear set further comprises hubs, gears and brushes. The motor, through the ninety degree gearbox, rotates a first individual gear, wherein the first individual gear engages and rotates a second individual gear, wherein the second individual gear engages and rotates a third individual gear, wherein the third individual gear engages and rotates a fourth individual gear, and so on in sequence through each individual gear.

Accordingly, rotation of the first individual gear of the second gear cabinet via the motor through the ninety degree gearbox rotates the remainder of gears, wherein odd-numbered gears rotate in a clockwise direction if viewed from a rear of the second gear cabinet and even-numbered gears rotate in a counterclockwise direction when viewed from the rear of the second gear cabinet.

It will be recognized by those skilled in the art that the opposite directional rotation of the gears of the first and second gear cabinets could be selected by, for exemplary purposes only, running the motors in reverse, or alternatively one motor on one gear cabinet could run forward, while the motor in the other gear cabinet could move in reverse.

The hubs in the first gear cabinet support the brushes of the first gear cabinet. The brushes of the first gear cabinet have a front face, a back face, lobes, back plates, throughholes and bristles. The bristles comprise a tip and an end, wherein the end is secured by a fastener, such as, for exemplary purposes only, crimped-on fasteners. It will be recognized by those skilled in the art that any type of fastener that prevents the end from passing through the throughholes would suffice. The bristles are inserted tip first through the throughholes of the lobes, and secured via the fastener, and the back plates are subsequently secured over the ends. The bristles extend laterally away from the front face of the lobes, wherein the tips of the bristles extend into the central channel and contact the poultry. Rotation of the brushes of the first gear cabinet causes the bristles to scour the surface of the poultry, thereby removing undesirable contaminants including bacteria from the poultry.

Likewise, the hubs of the second gear cabinet support the brushes of the second gear cabinet. The brushes of the second gear cabinet have a front face, a back face, lobes, back plates, throughholes and bristles. The bristles comprise a tip and an end, wherein the end is secured by a fastener, such as, for exemplary purposes only, crimped-on fasteners. It will be recognized by those skilled in the art that any type of fastener that prevents the end from passing through the throughholes would suffice. The bristles are inserted tip first through the throughholes of the lobes, and secured via the fastener, and the back plates are subsequently secured over the ends. The bristles extend laterally away from the front face of the lobes, wherein the tips of the bristles extend into the central channel and contact the poultry. Rotation of the brushes of the second gear cabinet causes the bristles to scour the surface of the poultry, thereby removing undesirable contaminants including bacteria from the poultry.

The bristles comprise, for exemplary purposes only, polypropylene or similar, tough, but resilient, material. While the brushes of the first and second gear cabinet rotate and scour the bird, water, or other cleaning fluid, is sprayed from water spray inlets toward the bird, wherein the combination of brushing and spray washing facilitates cleaning of the bird in an effective manner.

The motor of the first gear cabinet is selectively rotated in one direction and the motor of the second gear cabinet is selectively rotated either in the same direction as the motor of the first gear cabinet or in the opposite direction to the motor of the second gear cabinet. Thus, selection of direction of rotation of the motors of the first or second gear cabinet causes the brushes of the first gear cabinet and the brushes of the second gear cabinet to rotate together in the same direction or separately in opposite directions.

A first end and a second end of the first gear cabinet and the second gear cabinet attach to threaded height adjusters, wherein the threaded height adjusters comprise blocks, a threaded bolt and bars. The vertical position of the scrubber is controlled via the threaded height adjusters, wherein operation of the threaded height adjusters positions the first and/or second gear cabinet upward or downward to move the scrubber into the most effective height for scrubbing the bird by the sequence of the brushes of the first gear cabinet and the brushes of the second gear cabinet.

Additionally, the bars attach to width adjusters, wherein the width adjusters comprise rollers, a screw adjustment and a rod. The width between the first gear cabinet and the second gear cabinet is controlled via the width adjusters, wherein operation of the width adjusters shorten or extend the rod via the screw adjustment, and wherein the rod is disposed on the rollers, such that the first gear cabinet and the second gear cabinet could be selectively spaced apart and/or swiveled to provide positional spacing as desired.

In use, the bird is suspended from the shackle, wherein the shackle comprises loops, and wherein tarsal joints of legs of the bird are secured within the loops. Subsequently, the shackle travels down the track via a conveyer at a fixed height, conveying the bird through the scrubber from the first end to the second end. As the bird traverses through the central channel, rotation of the first and second gear brushes causes the tips of the bristles to vigorously scour the bird. Selected directional rotation of the brushes of the first gear cabinet causes the bristles to move upward, exposing the underwing areas of the bird. As the bird reaches the second individual brushes of the first gear cabinet, the wing is brushed downward by the bristles. Continuing forward, the bird reaches the subsequent brushes of the first and second gear cabinet, wherein once again the bristles move upward again exposing and cleaning the underwing areas. After the bird completes its traverse through the central channel it has been effectively cleaned.

In an alternate embodiment, it is envisioned that the machine for scrubbing could comprise a system of pulleys instead of gear rotation of the hubs. In a further alternate embodiment, different rotational directions of the brushes of the first gear cabinet and the brushes of the second gear cabinet could be utilized. In another alternate embodiment, the first gear cabinet and the second gear cabinet could be pivoted along their horizontal axis via a plate and screw adjustment mechanism. In yet another alternate embodiment, the brushes of the first and second gear cabinet could be swivelly-secured to the gears of the first and second gear cabinet, respectively, to permit adjustment. In still a further alternate embodiment, the brushes could be swivelly secured to the gears.

Accordingly, a feature and advantage of the present invention is its ability to clean contaminants from the exterior of a fowl.

Another feature and advantage of the present invention is its ability to provide cleaning under wing areas of a fowl.

Still another feature and advantage of the present invention is its ability to be selectively rotationally-modified to provide different patterns of brushing.

Yet another feature and advantage of the present invention is its ability to adjust spacing between brushes.

Yet still another feature and advantage of the present invention is that the brushes can be swiveled independently.

A further feature and advantage of the present invention is its ability to employ different means for rotating the brushes.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATIVE EMBODIMENTS

Figure 1:
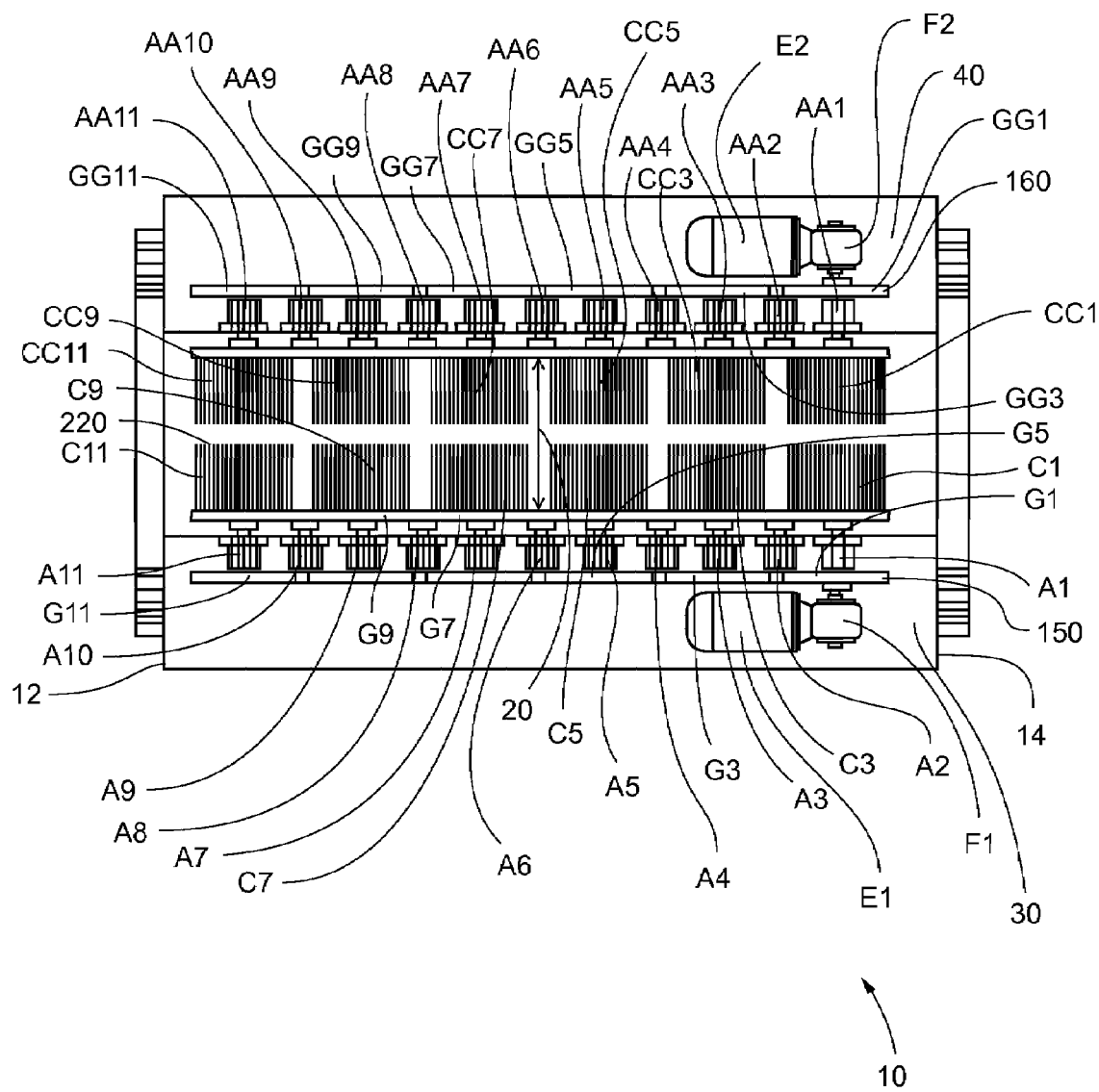
FIG. 1 is a top view of a machine for scrubbing the exterior of a fowl according to a preferred embodiment of the present invention with topmost gears and brushes removed for clarity.

In describing the preferred and selected alternate embodiments of the present invention, as illustrated in FIGS. 1-7, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-7, the present invention in a preferred embodiment is a machine for scrubbing the exterior of a fowl comprising scrubber 10, wherein scrubber 10 comprises track 70 (best shown in FIGS. 2 and 5), central channel 20, gap 95 (best shown in FIG. 2), first gear cabinet 30 and second gear cabinet 40, wherein first gear cabinet 30 comprises first brush set 50, and wherein second gear cabinet 40 comprises second brush set 60. First brush set 50 and second brush set 60 are disposed within central channel 20 and track 70 is disposed above central channel 20, wherein track 70 comprises shackle 80 for suspending bird 100 (best shown in FIG. 2).

Figure 3A:
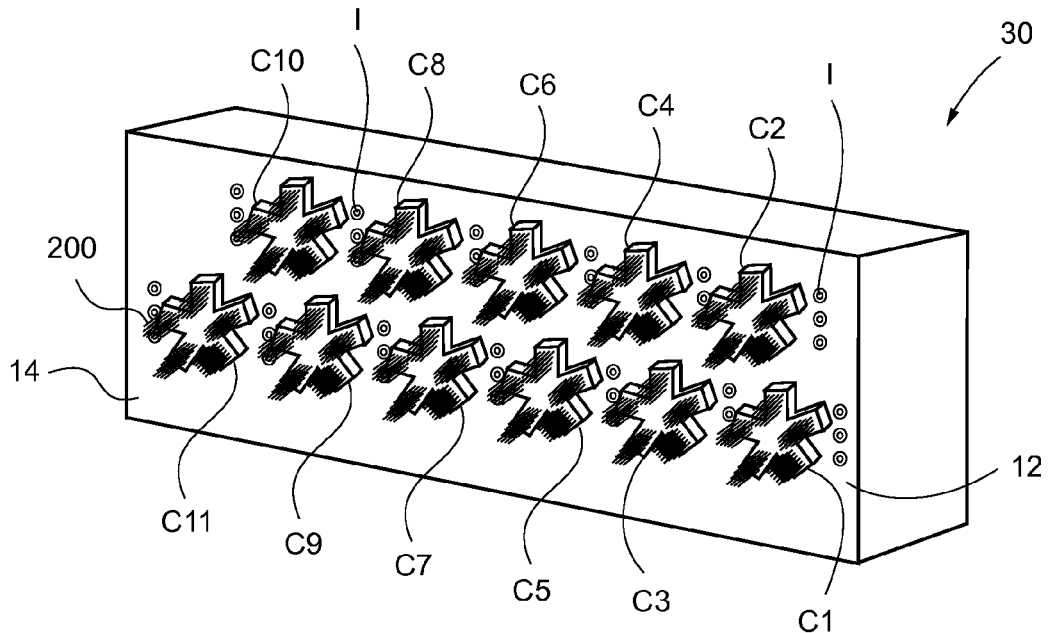
FIG. 3A is an interior perspective view of a first gear cabinet of a machine for scrubbing the exterior of a fowl according to a preferred embodiment of the present invention, showing brushes and bristles.
Figure 3B:
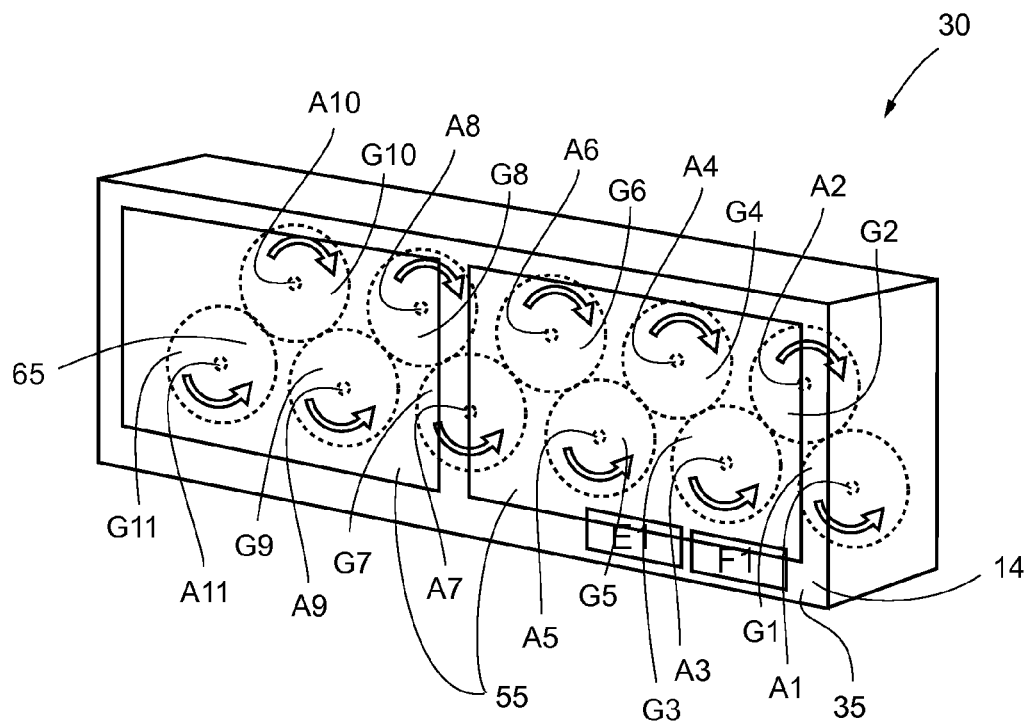
FIG. 3B is an exterior perspective view of a first gear cabinet of a machine for scrubbing the exterior of fowl according to a preferred embodiment of the present invention, showing gear and hub rotational directions.

Turning more particularly to FIGS. 1, 3A-B, first gear cabinet 30 comprises first gear set doors 55, motor E1, ninety degree gearbox F1 and first gear set 150 (best shown in FIG. 1) further comprises hubs A1-A11, gears G1-G11 and brushes C1-C11, and wherein motor E1, through ninety degree gearbox F1, further rotates individual gear G1, and wherein individual gear G1 engages and rotates individual gear G2, and wherein individual gear G2 engages and rotates individual gear G3, and wherein individual gear G3 engages and rotates individual gear G4, and so on in sequence through individual gear G11.

Accordingly, rotation of individual gear G1 via motor E1, through ninety degree gearbox F1, further rotates the remainder of individual gears G2 through G11, wherein odd-numbered gears G1, G3, G5, G7, G9 and G11 rotate in a counter-clockwise direction if viewed from rear 35 of first gear cabinet 30 and even-numbered gears G2, G4, G6, G8 and G10 rotate in a clockwise direction when viewed from rear 35 of first gear cabinet 30. If viewed from within channel 20, the rotation would be opposite to that described above.

Figure 4A:
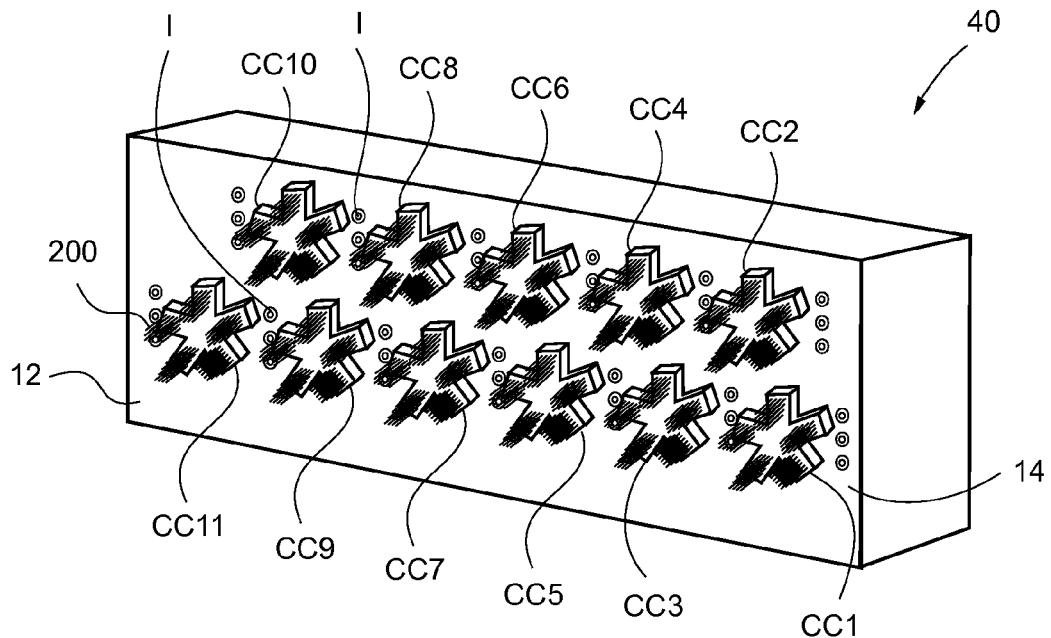
FIG. 4A is an interior perspective view of a second gear cabinet of a machine for scrubbing the exterior of a fowl according to a preferred embodiment of the present invention, showing brushes and bristles.
Figure 4B:
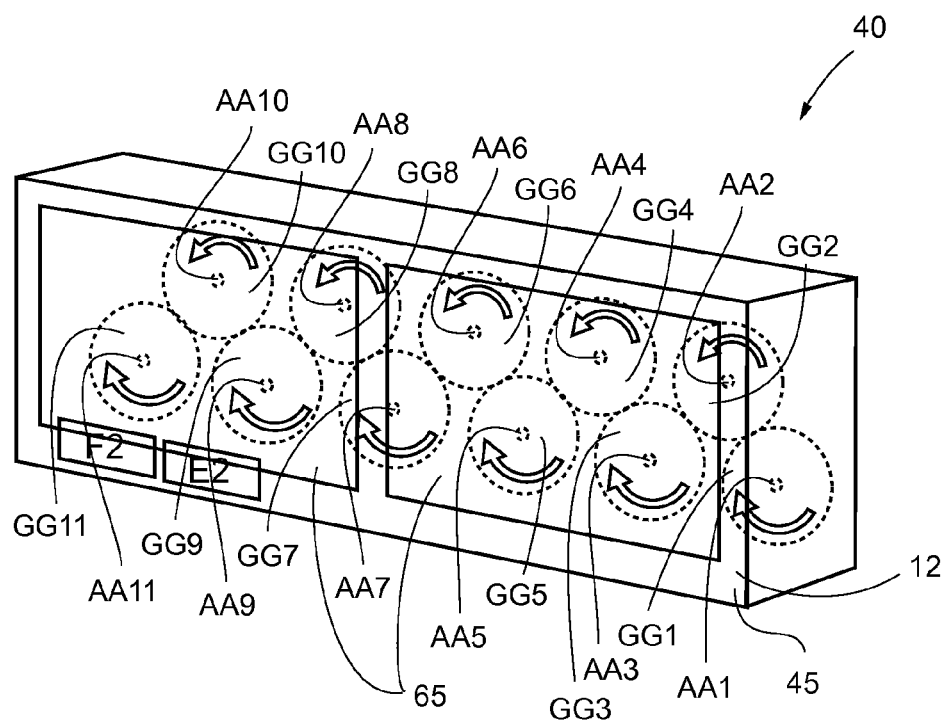
FIG. 4B is an exterior perspective view of a second gear cabinet of a machine for scrubbing the exterior of fowl according to a preferred embodiment of the present invention, showing gear and hub rotational directions.

Turning now more particularly to FIGS. 1, 4A-B, second gear cabinet 40 comprises second gear set doors 65, motor E2, ninety degree gearbox F2 and second gear set 160 (best shown in FIG. 1) further comprises hubs AA1-AA11, gears GG1-GG11 and brushes CC1-CC11, and wherein motor E2 through ninety degree gearbox F2 rotates individual gear GG1, and wherein individual gear GG1 engages and rotates individual gear GG2, and wherein individual gear GG2 engages and rotates individual gear GG3, and wherein individual gear GG3 engages and rotates individual gear GG4, and so on in sequence through individual gear GG11.

Accordingly, rotation of individual gear GG1 via motor E2 through ninety degree gearbox F2 rotates the remainder of individual gears GG2 through GG11, wherein odd-numbered gears GG1, GG3, GG5, GG7, GG9 and GG11 rotate in a clockwise direction if viewed from rear 45 of second gear cabinet 40 and even-numbered gears GG2, GG4, GG6, GG8 and GG10 rotate in a anti-clockwise direction when viewed from rear 45 of second gear cabinet 40. If viewed from within channel 20, the rotation would be opposite to that described above.

Figure 6A:
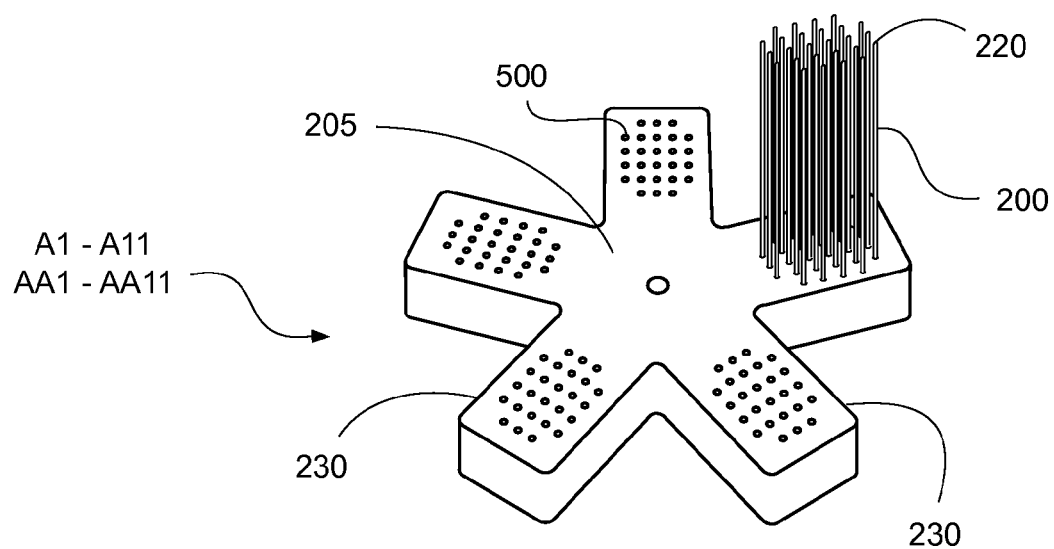
FIG. 6A is a front perspective view of a hub component of a machine for scrubbing the exterior of a fowl according to a preferred embodiment of the present invention.
Figure 6B:
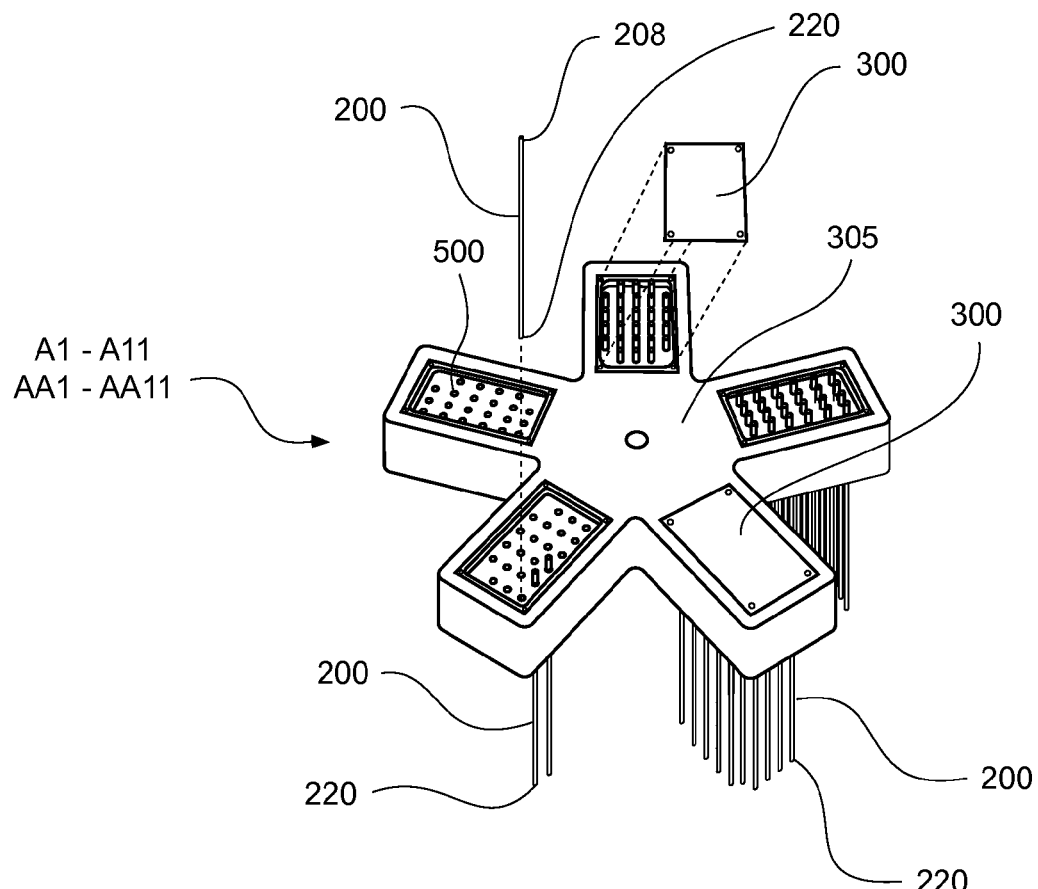
FIG. 6B is a rear perspective view of a hub component of a machine for scrubbing the exterior of a fowl according to a preferred embodiment of the present invention.
Figure 7:
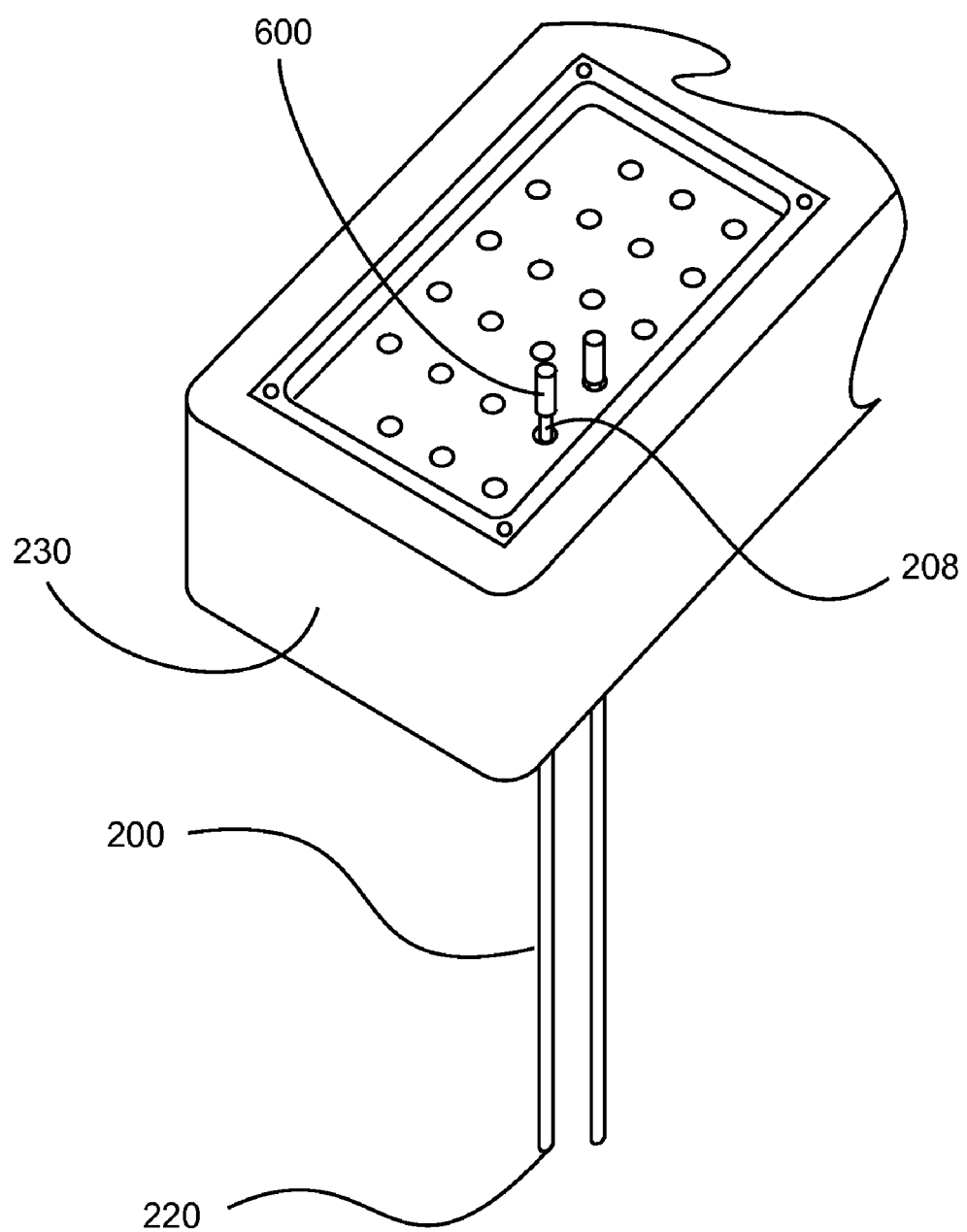
FIG. 7 is a detail perspective of the interior of a lobe of a hub component of a machine for scrubbing the exterior of a fowl according to a preferred embodiment of the present invention.

Turning now to FIGS. 6A, 6B and 7, bearing hubs A1 to A11 support brushes C1 through C11, respectively, wherein brushes C1 through C11 comprise front face 205, back face 305, lobes 230, back plates 300, throughholes 500 and bristles 200, and wherein bristles 200 comprise tip 220 and end 208, and wherein end 208 is secured by fastener 600, such as, for exemplary purposes only, crimped-on fasteners (best shown in FIG. 7). It will be recognized by those skilled in the art that any type of fastener 600 that prevents end 208 from passing through throughholes 500 would suffice. Bristles 200 are inserted tip first through throughholes 500 of lobes 230 via fastener 600, wherein back plates 300 are secured over ends 208, and wherein bristles 200 extend laterally away from front face 205 of lobes 230, and wherein tips 220 of bristles 200 extend into central channel 20 and contact bird 100. Rotation of brushes C1 through C11 causes bristles 200 to scour the surface of bird 100, thereby removing undesirable contaminants including bacteria from bird 100.

Similarly, bearing hubs AA1 to AA11 support brushes CC1 through CC11, respectively, wherein brushes CC1 through CC11 comprise front face 205, back face 305, lobes 230, back plates 300, throughholes 500 and bristles 200, and wherein bristles 200 comprise tip 220 and end 208, and wherein end 208 is secured by fastener 600, such as, for exemplary purposes only, crimped-on fasteners (best shown in FIG. 7). It will be recognized by those skilled in the art that any type of fastener 600 that prevents end 208 from passing through throughholes 500 would suffice. Bristles 200 are inserted tip first through throughholes 500 of lobes 230 via fastener 600, wherein back plates 300 are secured over ends 208, and wherein bristles 200 extend laterally away from front face 205 of lobes 230, and wherein tip 220 of bristles 200 extend into central channel 20 and contact bird 100. Rotation of brushes CC1 through CC11 causes bristles 200 to scour the surface of bird 100, thereby removing undesirable contaminants including bacteria from bird 100.

Bristles 200 comprise, for exemplary purposes only, polypropylene or similar, tough but resilient material. While brushes C1 through C11 and CC1 through CC11 rotate and scour bird 100, water, or other cleaning fluid, is sprayed from water spray inlets I toward bird 100, wherein the combination of brushing and spray washing facilitates cleaning of bird 100 in an effective manner.

Motor E1 is selectively rotated in one direction and motor E2 is selectively rotated either in the same direction as motor E1 or in the opposite direction to motor E2. Thus, selection of direction of rotation of motors E1, E2 causes brushes C1 and CC1 to rotate together in the same direction or separately in opposite directions.

Figure 5:
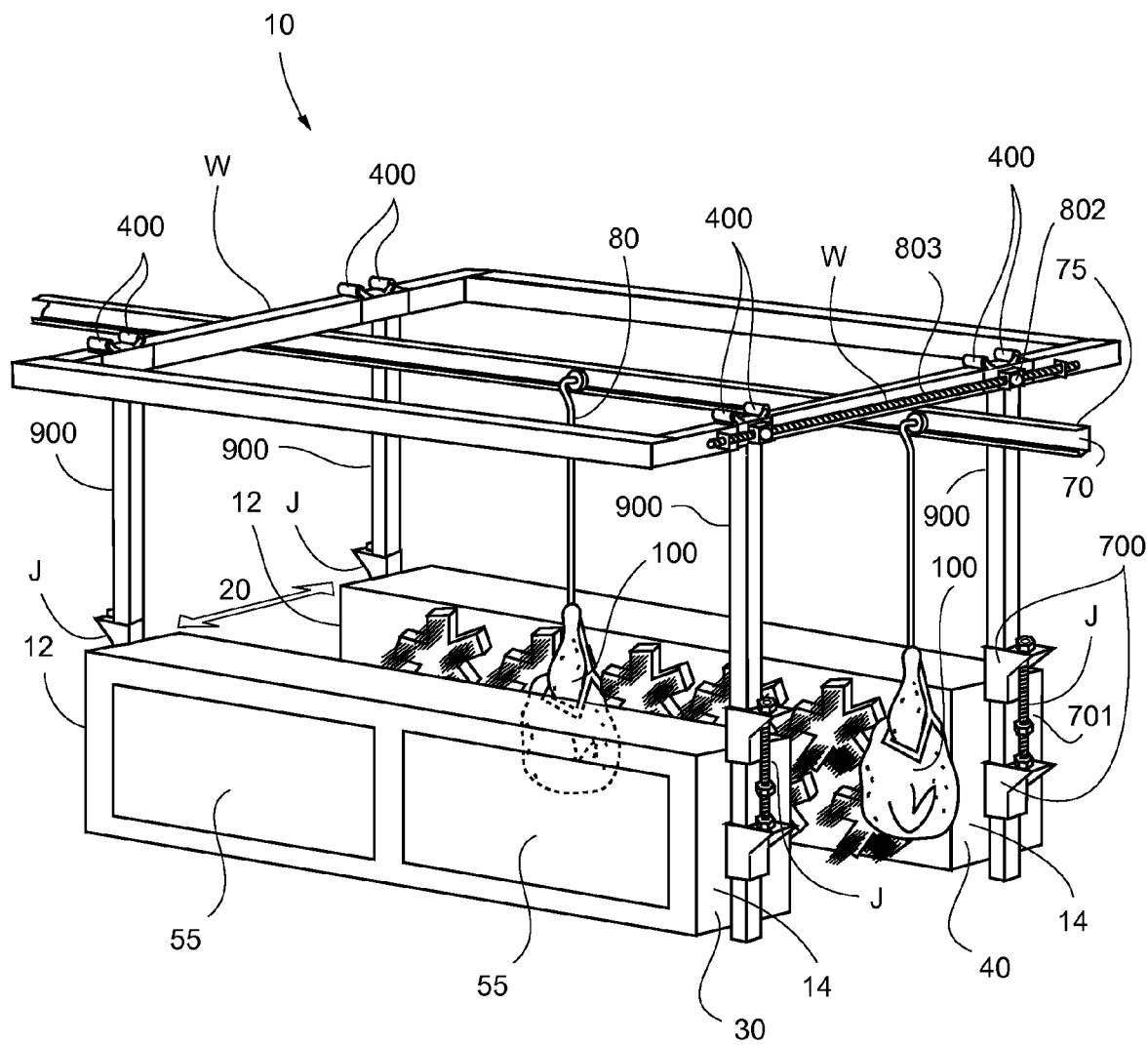
FIG. 5 is a side perspective of a machine for scrubbing the exterior of a fowl according to a preferred embodiment of the present invention, showing transport of fowl therethrough.

Turning specifically to FIG. 5, first ends 12 and second ends 14 comprise threaded height adjusters J, wherein threaded height adjusters J comprise blocks 700, threaded bolts 701 connected between pairs of blocks 700, and bars 900, and wherein one of each pair of blocks 700 is secured to each of bars 900 while the other block 700 of a pair is secured to each of gear cabinets 30, 40. Adjustment of threaded bolts 701 moves blocks 700 of a pair together or apart, thereby raising or lowering gear cabinets 30, 40. The vertical position of first gear cabinet 30 and second gear cabinet 40 is controlled via threaded height adjusters J. Thus, operation of threaded height adjusters J moves first gear cabinet 30 or second gear cabinet 40 upward or downward to position scrubber 10 at the most effective height for scrubbing bird 100 by the sequence of brushes C1 to C11 and brushes CC1 to CC11.

Also depicted in FIG. 5, bars 900 comprise screw adjustments 802 and rollers 400, wherein scrubber 10 is suspended from above on rollers 400. Width adjusters W accordingly comprise rollers 400, screw adjustment 802 and rod 803. The width between first gear cabinet 30 and second gear cabinet 40 is controlled via width adjusters W, wherein rotation of rod 803 moves screw adjustment 802, and wherein bars 900 are suspended via rollers 400, and wherein width adjusters W selectively position first gear cabinet 30 and second gear cabinet 40 apart. Alternately, gear cabinets 30, 40 can be swiveled via width adjusters W to provide positional spacing as desired.

Figure 2:
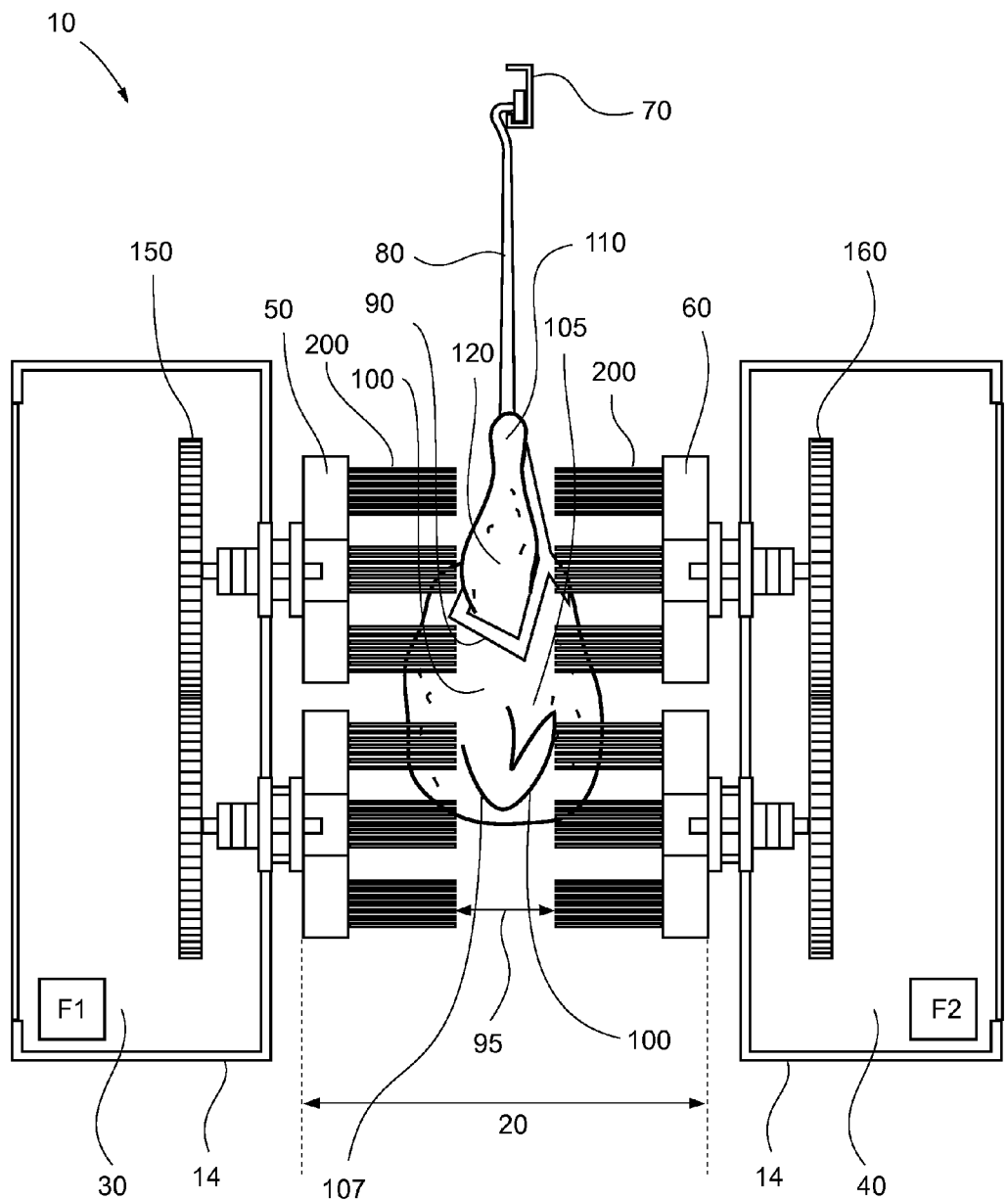
FIG. 2 is an end view of a machine for scrubbing the exterior of a fowl according to a preferred embodiment of the present invention, showing transport of a fowl therethrough.

Turning now more particularly to FIGS. 2 and 5, in use, bird 100 is suspended from shackle 80, wherein shackle 80 comprises loops 90, and wherein tarsal joints 110 of legs 120 of bird 100 are secured within loops 90. Subsequently, shackle 80 travels down track 70 via conveyer 75 (best shown in FIG. 5) at a fixed height, conveying bird 100 through scrubber 10 from first end 12 to second end 14.

Returning now more particularly to FIGS. 1, 2 and 5, as bird 100 traverses through central channel 20, rotation of brushes C1 to C11 and brushes CC1 to CC11 causes tips 220 to vigorously scour bird 100. Selected directional rotation of brushes C1 and CC1 as bird 100 approaches brushes C1 and CC1 causes bristles 200 to move upward, exposing underwing areas 105 of bird 100. As bird 100 reaches brushes C2 and CC2, wing 107 is brushed downward by bristles 200. Continuing forward, bird 100 reaches brushes C3 and CC3, wherein once again bristles 200 move upward again exposing and cleaning underwing areas 105. After bird 100 completes its traverse through central channel 20, it has been effectively cleaned.

It is envisioned in an alternate embodiment of the present invention that a system of pulleys could be utilized instead of hubs A1-A11, AA1-AA11.

It is envisioned in a further alternate embodiment of the present invention that different rotational directions of brushes C1 to C11 and brushes CC1 to CC11 could be utilized.

It is envisioned in still a further alternate embodiment that first gear cabinet 30 and second gear cabinet 40 can be pivoted along their horizontal length axis via a plate and screw adjustment mechanism.

In still a further alternate embodiment of the present invention, it is envisioned that brushes C1-C11 and CC1-CC11 could be swivelly-secured to gears G1-G11 and GG1-GG11, respectively, to permit adjustment.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A brush for use an apparatus for scrubbing a fowl, said brush configured to be rotated about a brush rotation axis while scrubbing the exterior of a fowl, said brush including a front face and a rear face, said front face configured to provide a fowl scrubbing function upon rotation of said brush, said brush comprising:
   A) a plurality of radially disposed lobes, each extending radially relative to said brush rotation axis, each lobe having a front face and a back face and including a plurality of throughholes having bore axes substantially parallel to said brush rotation axis;
   B) a plurality of substantially elongate bristle elements each corresponding to one said throughhole, each bristle element including a brushing tip and a retainable end opposite said brushing tip, each said bristle element itself including:
      1) an elongate body portion having a substantially constant transverse cross section along its length suitably sized such that at least a portion of said body portion can pass through its corresponding throughhole; and
      2) a retainable end portion too large to pass through its corresponding throughhole; and
   C) a plurality of back plates each corresponding to one of said plurality of radial lobes,
      each back plate being separately detachably mounted relative to its corresponding radial lobe so as to capture each of said retainable portions of all of said bristle elements associated with said particular lobe between said back plate and said back face of said lobe, such that detachment of a particular back plate from its corresponding lobe allows for any one of said bristle elements associated with that that particular lobe to be removed from its respective throughhole and replaced.

2. The brush as claimed in claim 1, wherein said bristle elements are each assemblies of separate components, said body portion being a first component and said retainable portion being a second component being a fastener, attached proximate the end opposite said brushing tip.

3. The brush as claimed in claim 2, wherein said fastener is crimped onto said body and is larger than its corresponding throughhole.

4. The brush as claimed in claim 3, said scrubbing tips are all situated in substantially the same scrubbing plane when installed, said scrubbing plane being substantially normal to said brush rotation axis.

5. The brush as claimed in claim 1, said scrubbing tips are all situated in substantially the same scrubbing plane when installed, said scrubbing plane being substantially normal to said brush rotation axis.

6. A method for scrubbing a plurality of fowl, comprising the steps of:
   A) providing a brush configured to be rotated about a brush rotation axis while scrubbing the exterior of a fowl, said brush including a front face and a rear face, said front face configured to provide a scrubbing function, said brush comprising:
      1) a plurality of radially disposed lobes, each extending radially relative to said brush rotation axis, each lobe having a front face and a back face and including a plurality of throughholes having bore axes substantially parallel to said brush rotation axis;
      2) a plurality of substantially elongate bristle elements each corresponding to one said throughhole, each bristle element including a brushing tip and a retainable end opposite said brushing tip, each said bristle element itself including:
         a) an elongate body portion having a substantially constant transverse cross section along its length suitably sized such that at least a portion of said body portion can pass through its corresponding throughhole; and
         b) a retainable end portion too large to pass through its corresponding throughhole; and
      3) a plurality of back plates each corresponding to one of said plurality of radial lobes, each back plate being separately detachably mounted relative to its corresponding radial lobe so as to capture each of said retainable portions of all of said bristle elements associated with said particular lobe between said back plate and said back face of said lobe;

B) rotating said brush about a brush rotation axis while scrubbing the exterior of a first fowl;

C) stopping rotation of said brush;

D) detaching one of said back plates relative to its corresponding radial lobe;

E) removing one of said bristle elements associated with said particular lobe associated with Step "D" by withdrawing said bristle element from its corresponding throughhole;

F) inserting a second bristle element into the corresponding throughhole associated with Step "D" by inserting the brushing tip of second bristle element into said corresponding throughhole;

G) replacing the back plate detached in Step "D"; and

H) rotating said brush about said brush rotation axis while scrubbing the exterior of a second fowl.

7. A machine for scrubbing a fowl being transported along a fowl transport path, said machine comprising:

A) a first cabinet on a first side of said fowl transport path, said first cabinet including a first inside surface defining one side of a channel, said first cabinet itself comprising:

1) a row of at least three fowl scrubbing brushes along and facing said fowl transport path, said row being aligned in a row along a row axis being substantially parallel to said fowl transport path and including a first brush, a second brush, and a third brush, all configured to generally scrub one side of fowl as it moves along said transport path;

2) at least two water spray inlets for spraying water into said channel, said water spray inlets including a first water spray inlet and a second water spray inlet, said first water spray inlet positioned between said first and second brushes, and said second water spray inlet positioned between said second and third brushes; and B) a second cabinet on a second side of fowl transport path, being opposite said path relative to said first cabinet, said second cabinet including a first inside surface defining a second side of a channel, said second cabinet itself comprising a plurality of brushes configured to generally scrub a second side of fowl moving along said transport path, said second side being generally opposite said first side of said fowl being scrubbed by said fowl scrubbing brushes of said first cabinet, such that a given portion of a fowl being transported along said fowl transport path will be first brushed by said first brush, subsequently rinsed by first water supply inlet, subsequently brushed by said second brush, subsequently rinsed by second water supply inlet, and subsequently brushed by said third brush.

8. The machine as claimed in claim 7, wherein said row of at least three fowl scrubbing brushes is an upper row along a first row axis, such that said given portion of said fowl is a first given portion, and further comprising:

a second row of at least three fowl scrubbing brushes along and facing said fowl transport path but relatively below said first row of three fowl scrubbing brushes, said second row being aligned in a row along a second row axis being substantially parallel to said fowl transport path and including a fourth brush, a fifth brush, and a sixth brush, all configured to generally scrub said one side of fowl moving along said transport path, said first and second rows being staggered in top row and bottom row configuration, respectively; and third and fourth water spray inlets for spraying water into said channel, said third water spray inlet positioned between said fourth and fifth brushes, and said fourth water spray inlet positioned between said fifth and sixth brushes, such that a second given portion of a fowl being transported along said fowl transport path will be first brushed by said fourth brush, subsequently rinsed by third water supply inlet, subsequently brushed by said fifth brush, subsequently rinsed by fourth water supply inlet, and subsequently brushed by said sixth brush.

9. The machine as claimed in claim 8, wherein said second cabinet includes corresponding brushes and water supply inlets facing similar elements of said first cabinet.

10. The machine as claimed in claim 7, wherein said second cabinet includes corresponding brushes and water supply inlets facing similar elements of said first cabinet.

11. A method for scrubbing a fowl being transported along a fowl transport path, said machine comprising the steps of:

A) providing a first cabinet on a first side of said fowl transport path, said first cabinet including a first inside surface defining one side of a channel, said first cabinet itself comprising:

1) a row of at least three fowl scrubbing brushes along and facing said fowl transport path, said row being aligned in a row along a row axis being substantially parallel to said fowl transport path and including a first brush, a second brush, and a third brush, all configured to generally scrub one side of fowl as it moves along said transport path;

2) at least two water spray inlets for spraying water into said channel, said water spray inlets including a first water spray inlet and a second water spray inlet, said first water spray inlet positioned between said first and second brushes, and said second water spray inlet positioned between said second and third brushes; and B) providing a second cabinet on a second side of fowl transport path, being opposite said path relative to said first cabinet, said second cabinet including a first inside surface defining a second side of a channel, said second cabinet itself comprising a plurality of brushes configured to generally scrub a second side of fowl moving along said transport path, said second side being generally opposite said first side of said fowl being scrubbed by said fowl scrubbing brushes of said first cabinet; and C) transporting said fowl along said fowl transport path such that a given portion of said fowl is first brushed by said first brush;

D) subsequent to Step "C", transporting said fowl along said fowl transport path such that given portion of said fowl is rinsed by first water supply inlet;

E) subsequent to Step "D", transporting said fowl along said fowl transport path such that given portion of said fowl is brushed by said second brush; and F) subsequent to Step "D", transporting said fowl along said fowl transport path such that given portion of said fowl is rinsed by second water supply inlet; and G) subsequent to Step "F", transporting said fowl along said fowl transport path such that given portion of said fowl is brushed by said third brush.

12. A machine for scrubbing a fowl being transported along a fowl transport path, said machine comprising:

A) a first cabinet on a first side of said fowl transport path, said first cabinet including a first inside surface defining one side of a channel, said first cabinet itself comprising a plurality of fowl scrubbing brushes along and facing said fowl transport path and configured to generally scrub one side of fowl moving along said transport path, said brushes being aligned in a row along a row axis being substantially parallel to said fowl transport path, each of said brushes itself comprising:

1) a plurality of radially disposed lobes, each extending radially relative to said brush rotation axis, each lobe having a front face and a back face and including a plurality of throughholes having bore axes substantially parallel to said brush rotation axis;

2) a plurality of substantially elongate bristle elements each corresponding to one said throughhole, each bristle element including a brushing tip and a retainable end opposite said brushing tip, each said bristle element itself including:

a) an elongate body portion having a substantially constant transverse cross section along its length suitably sized such that at least a portion of said body portion can pass through its corresponding throughhole; and b) a retainable end portion too large to pass through its corresponding throughhole; and 3) a plurality of back plates each corresponding to one of said plurality of radial lobes, each back plate being separately detachably mounted relative to its corresponding radial lobe so as to capture each of said retainable portions of all of said bristle elements associated with said particular lobe between said back plate and said back face of said lobe, such that detachment of a particular back plate from its corresponding lobe allows for any one of said bristle elements associated with that that particular lobe to be removed from its respective throughhole and replaced;

B) a second cabinet on a second side of fowl transport path, being opposite said path relative to said first cabinet, said second cabinet including a first inside surface defining a second side of a channel, said second cabinet itself comprising a plurality of brushes configured to generally scrub a second side of fowl moving along said transport path, said second side being generally opposite said first side of said fowl being scrubbed by said fowl scrubbing brushes of said first cabinet.

13. The machine as claimed in claim 12, wherein said plurality of fowl scrubbing brushes of said first cabinet includes a row of at least three fowl scrubbing brushes including a first brush, a second brush, and a third brush; and wherein said first cabinet further comprises:

at least two water spray inlets for spraying water into said channel, said water spray inlets including a first water spray inlet and a second water spray inlet, said first water spray inlet positioned between said first and second brushes, and said second water spray inlet positioned between said second and third brushes; and such that a given portion of a fowl being transported along said fowl transport path will be first brushed by said first brush, subsequently rinsed by first water supply inlet, subsequently brushed by said second brush, subsequently rinsed by second water supply inlet, and subsequently brushed by said third brush.

* * * * *